United States Patent
Hu et al.

(10) Patent No.: US 11,526,860 B1
(45) Date of Patent: *Dec. 13, 2022

(54) MOBILE CASH DEPOSIT SYSTEM AND METHOD

(71) Applicant: United Services Automobile Association (USAA), San Antonio, TX (US)

(72) Inventors: Yongxiang Hu, San Antonio, TX (US); Diana Reyna, San Antonio, TX (US); Aaron Lee Van Heldorf, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/405,522

(22) Filed: Aug. 18, 2021

Related U.S. Application Data

(63) Continuation of application No. 16/704,991, filed on Dec. 5, 2019, now Pat. No. 11,107,051, which is a
(Continued)

(51) Int. Cl.
  *G06Q 20/10* (2012.01)
  *G06K 19/06* (2006.01)
  (Continued)

(52) U.S. Cl.
  CPC ..... *G06Q 20/108* (2013.01); *G06K 19/06037* (2013.01); *G06T 5/50* (2013.01); *G06Q 20/326* (2020.05); *G06Q 20/4014* (2013.01)

(58) Field of Classification Search
  CPC ........... G06Q 20/108; G06Q 20/326; G06Q 20/4014; G06K 19/06037; G06T 5/50
  See application file for complete search history.

(56) References Cited

U.S. PATENT DOCUMENTS

| 7,653,600 B2 | 6/2010 | Gustin et al. |
| 2003/0059098 A1 | 3/2003 | Jones et al. |

(Continued)

FOREIGN PATENT DOCUMENTS

| EP | 0984410 A1 | 3/2000 | |
| IN | 666/DEL/2014 A * | 9/2015 | ............... G07G 5/00 |
| WO | WO-2013098556 A1 * | 7/2013 | ........... G06Q 20/042 |

OTHER PUBLICATIONS

Roy et al.: Embeded System for Cash Deposit in ATM, 2015, 2nd International Conference on Innovations in Information Embedded and Communication Systems ICIIECS'15, pp. 1-4. (Year: 2015).*
(Continued)

*Primary Examiner* — Bijendra K Shrestha
(74) *Attorney, Agent, or Firm* — Fletcher Yoder, P.C.

(57) ABSTRACT

An electronic cash deposit system includes a processor that receives a user-generated request for a deposit of cash into an account, receive data generated from a scan of a machine-readable image on a receptacle that receives the cash, perform a validation of the deposit of the cash based on a correlation between the data generated from the scan and a transaction key, generate confirmation of the deposit of the cash when the validation is confirmed, and send a notification to a banking system to update the account to reflect the deposit of the cash in response to the confirmation being generated.

20 Claims, 4 Drawing Sheets

Related U.S. Application Data continuation of application No. 15/684,704, filed on Aug. 23, 2017, now Pat. No. 10,504,077.

(60) Provisional application No. 62/379,104, filed on Aug. 24, 2016.

(51) Int. Cl.
*G06T 5/50* (2006.01)
*G06Q 20/40* (2012.01)
*G06Q 20/32* (2012.01)

(56) References Cited

U.S. PATENT DOCUMENTS

| | | | |
|---|---|---|---|
| 2007/0235523 A1 | 10/2007 | Clements | |
| 2012/0185393 A1* | 7/2012 | Atsmon | G06Q 20/389 |
| | | | 382/103 |
| 2013/0264387 A1* | 10/2013 | Siemens | G07D 11/0093 |
| | | | 235/382 |

OTHER PUBLICATIONS

Sit, Harry: How to Deposit Cash to Online Bank Account, Sep. 6, 2012, The Financial Buff, pp. 1-4. (Year: 2012).*
Fiserv: Next-Generation Cash Management for Your Merchant Customers, 2015, pp. 1-4. (Year: 2015).*
Remote Deposit Capture: Remote Deposit Capture Goes Mobile: Mitek System Launches First Mobile Check Deposit and Bill Pay Application, Jan. 22, 2008, p. 1. (Year: 2008).
Bank of America/Merrill Lynch: Remote Deposit Service Online: Cash Pro Online User Guide, 2012, pp. 1-77. (Year: 2012).

* cited by examiner

MOBILE CASH DEPOSIT SYSTEM AND METHOD

CROSS-REFERENCE TO RELATED APPLICATION

This application is a continuation of U.S. patent application Ser. No. 16/704,991, entitled "MOBILE CASH DEPOSIT SYSTEM AND METHOD," filed Dec. 5, 2019, which claims priority to and the benefit of U.S. patent application Ser. No. 15/684,704, entitled "MOBILE CASH DEPOSIT SYSTEM AND METHOD," filed Aug. 23, 2017, now U.S. Pat. No. 10,504,077, issued Dec. 10, 2019, which claims priority to and the benefit of U.S. Provisional Application No. 62/379,104, entitled "MOBILE CASH DEPOSIT SYSTEM AND METHOD," filed Aug. 24, 2016, which is hereby incorporated by reference in its entirety for all purposes.

BACKGROUND

The present disclosure generally relates to systems and methods for monetary deposits. More specifically, the present disclosure relates to systems and methods that facilitate provision of monetary deposits at locations remote from a traditional deposit facility or device.

Checks, credit cards, and debit cards are often considered secure and convenient methods for an individual to transmit funds (e.g., purchase goods and services). However, there is some level of inconvenience associated with the use of such fund transference devices. For example, in order to use a check for a purchase, a funding recipient must be willing to accept the check and properly deposit or cash it. Cash, in comparison, is generally considered the most liquid type of asset, which makes it very useful. While generally considered less secure than a check or similar payment method, cash is usually freely transferable and does not require endorsement. Thus, the possessor of cash is most often the owner of the cash. However, because cash is very liquid and freely transferable, an individual that loses cash or has it stolen from them will have difficulty recovering it. Therefore, while many individuals and businesses prefer to have a certain amount cash available for daily use, those in possession of a significant amount of cash that has accumulated over time will likely travel to a secure location, such as a bank, to deposit the accumulated cash. It is now recognized that improved systems and methods for facilitating the transfer of cash into secure facilities (e.g., banks) are desirable.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an electronic cash deposit system includes one or more processors that may receive a user-generated request for a deposit of cash into an account, receive data generated from a scan of a machine-readable image on a receptacle that receives the cash, and performs a validation of the deposit of the cash based on a correlation between the data generated from the scan and a transaction key associated with the machine-readable image. The processor may then generate a confirmation of the deposit of the cash in response to the validation of the deposit and send a notification to a banking system to update the account to reflect the deposit of the cash in response to the confirmation being generated.

In another embodiment, a method may include receiving, via a processor, a user-generated request for a deposit of cash into an account and receiving, via the processor, data generated from a scan of a machine-readable image on a receptacle configured to receive the cash. The method may also include performing, via the processor, a validation of the deposit of the cash based on a correlation between the data generated from the scan and a transaction key associated with the machine-readable image and generating, via the processor, a confirmation of the deposit of the cash in response to the validation of the deposit. The method may then include sending, via the processor, a notification to a banking system to update the account to reflect the deposit of the cash in response to the confirmation being generated.

In yet another embodiment, a system may include a first computing device that may receive a user request for a deposit of cash into an account and determine a location of the first computing device in response to receiving the user-generated request. The system may also include a second computing device that may receive the user request and the location from the first computing device, receive data generated from a scan of a machine-readable image on a receptacle configured to receive the cash, and perform a validation of the deposit of the cash based on a correlation between the data generated from the scan and a transaction key associated with the machine-readable image. The second computing device may then generate a confirmation of the deposit of the cash in response to the validation of the deposit and send a notification to a banking system to update the account to reflect the deposit of the cash in response to the confirmation being generated.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
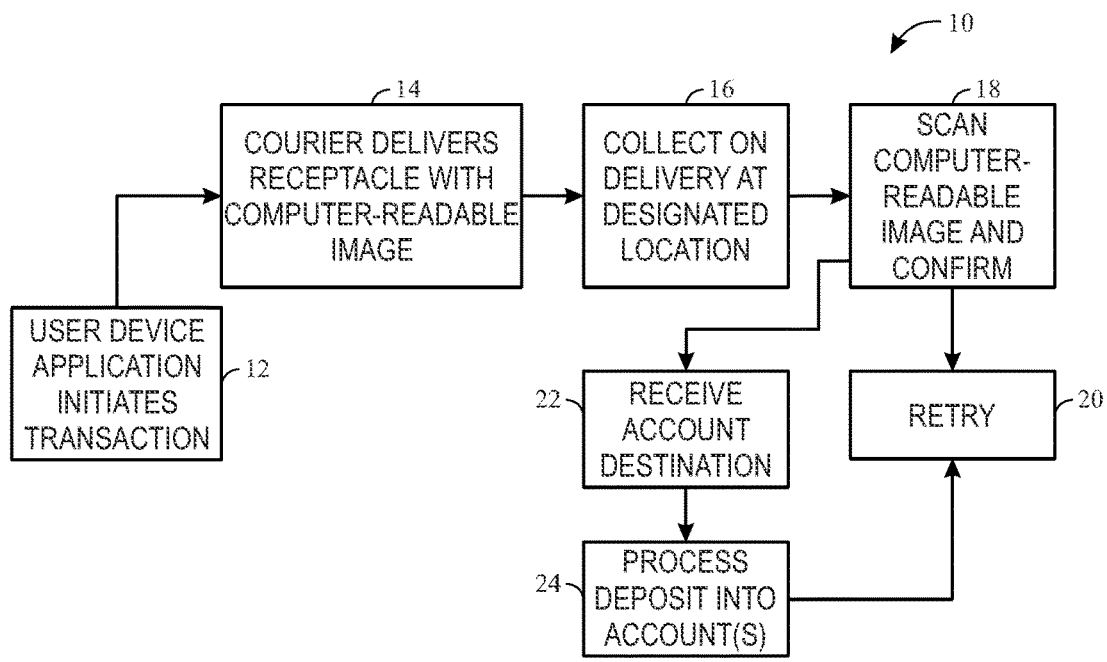
FIG. 1 illustrates a block diagram of a process for remote cash deposit, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Cash is generally considered a highly liquid asset, which makes it very desirable for use in transactions. However, this liquidity can also be a detriment. For example, cash can be lost or stolen without being easily traceable. Further, because cash is highly liquid and transferable, transaction history can be difficult to verify. Thus, while businesses and individuals often benefit from maintaining certain levels of cash that is immediately available, it is generally desirable to periodically deposit cash in a bank account or the like. Traditionally, such deposits occur at fixed locations (e.g., brick and mortar bank locations or automatic teller machines). However, it is now recognized that such locations are not always accessible to or convenient for users. For example, certain users may have limited access to transportation, disabilities that make access to such locations difficult, reside in areas (e.g., rural areas) that are distant from such facilities, have a preference for not traveling with large sums of cash, and so forth.

Accordingly, present embodiments provide systems and methods for allowing users (e.g., members of a bank) to deposit cash into at least one bank account without using traditional fixed banking locations. Specifically, present embodiments facilitate the initiation of collect-on-delivery (COD) services (e.g., via a courier service company) to make cash deposits at remote locations (e.g., remote from traditional fixed locations). Thus, present embodiments include and facilitate the use of COD to make bank account transactions (e.g., depositing cash, depositing checks, transferring cash). Further, present embodiments operate to limit travel and potential risks (e.g., risk of loss of cash) associated with making cash deposits at traditional fixed locations. Additionally, present embodiments operate to confirm remote cash deposits and provide transaction histories for such cash deposits. It should be noted that, while the discussion below generally focuses on cash-based transactions, present embodiments may also be employed with checks, money orders, and so forth.

In one embodiment, a user initiates a remote cash deposit by submitting a request for such a transaction to a banking system. For example, such a user-generated request may be submitted via a financial management application being executed by a user device, such as a laptop computer, desktop computer, mobile device (e.g., smart phone), or the like. The banking system or bank-side computer network includes a computer with a processor that may receive and process such a request. The user-generated request may include a designated amount (e.g., $350.00) for the cash deposit along with a proposed period (e.g., date, time) and/or location for the transaction to take place. In some embodiments, the financial management application may auto-populate or propose a location for the transaction based on global positioning system (GPS) data obtained from features of the user device, based on a search for the user's address in a database of the banking system, or the like.

After receiving the request and prior or subsequent to confirmation of the cash amount via other system features (e.g., a money counting device), a computer-readable image, such as a bar code (e.g., a Quick Response code ("QR code")) or some other confirmation mechanism may be generated (e.g., by the financial management application or the banking system). The computer-readable image may incorporate certain information about the transaction. For example, the computer-readable image may incorporate an encrypted transaction key, which may be used to confirm the transaction and associate it with the user. Further, in some embodiments, the computer-readable image may incorporate identifying information for the cash itself, such as data from an image of the cash, output from a money counter, and/or serial numbers scanned from the cash, for confirmation of the deposit amount. In other embodiments, confirmation may be achieved using biometrics, passwords, and so forth, which may be utilized separately or integrated with the computer-readable image.

It should be noted that, in some embodiments, the computer-readable image (or other confirmation feature) may be generated remote from a location (e.g., home) associated with the user device. That is, the computer-readable image may be generated by another party, such as a courier service, and may assist the courier service with the collection and tracking of the cash from the user. For example, when the scheduled deposit takes place, the courier service provides the cash receptacle with the computer-readable image to the user. The computer-readable image may be disposed on or displayed by a receptacle for the cash. For example, the computer-readable image may be printed on an envelope, printed on a sticker for attachment to a container, or displayed on a screen (e.g., a liquid crystal display (LCD)) of a lock box for receiving, holding, and/or counting the cash deposit. In some embodiments, the computer-readable image may be displayed separately (e.g., on a courier's device, which may be handheld or attached to the courier's vehicle). The courier may print or otherwise provide the computer-readable image based on receipt of the computer-readable image from the banking system or the financial management application of the user's device. However, the courier may also generate the computer-readable image. Further, other digital or non-digital verification methods may be employed.

While certain embodiments relate to specific types of account deposits and certain orders of processing, it should be noted that present embodiments facilitate various different types of transactions and orders of processing. For example, a user may provide a cash or check to a service provider and request that the computer-readable image or some other confirmation code be provided to another person who can then scan and deposit the funds to an account selected by them. Present embodiments may also facilitate cash payments for services (e.g., access to digital content), bitcoins, or other forms of currency which could be credited using a provided verification code. For example, upon confirmation of a cash deposit, the amount may be automatically directed to payment for a subscription service, for downloading an application (e.g., a cell phone app), or for provision of credit.

Once a receptacle for deposit has been provided via the courier, the cash may be inserted into the receptacle and the user may then scan the computer-readable image using the user device and the financial management application to confirm deposit of the cash into the receptacle. In some embodiments, the cash may first be imaged (e.g., scanned) for confirmation and the resulting data may be incorporated into the computer-readable image, which may be generated at the location of the remote cash deposit. For example, optical character recognition (OCR) may be employed to read serial numbers from the cash, and this data may be incorporated into generating the computer-readable image, such that specific information about the cash is associated with the transaction, which can be utilized for later confirmation. Once the computer-readable image has been scanned as a confirmation of deposit, the financial management application may provide the user with a list of accounts from which the user can select one or more accounts to receive funds from the cash deposited. The selected account or accounts (whether selected at this stage or via the initial request) may then be electronically updated to indicate receipt of the funds. Specifically, for example, the courier may retain the cash and wire a corresponding amount of money (e.g., less fees for the remote deposit transaction) to the user's account or accounts. The courier can wire to the user's account or to the user's financial institution who, after verification of the transaction (e.g. through the scanning of the verification image), can credit the user's account with the funds. It should be noted that such wire transactions may be performed via systems and or methods in accordance with present embodiments, such as systems and methods related to the financial management application. Thus, present embodiments facilitate access to cash deposits from remote locations while providing verification of the deposit in essentially real-time via scanning of the computer-readable image.

FIG. 1 illustrates a block diagram of a process 10 for remote cash deposit, in accordance with embodiments described herein. The process 10 includes initiating a remote cash deposit transaction via a financial management application being executed on a user device (e.g., a financial management application on a smart phone), as represented by block 12. This may include electronically transmitting a request to a banking system (e.g., computer network, which may include a financial institution's computer network or financial exchange network) configured to receive the request and initiate a request for collect-on-delivery service via a courier. For example, a request for a courier may be sent from the banking system to a courier system, which may be selected by the user or the banking system (e.g., based on displayed performance criteria, cost or the like) from a number of available courier services. As represented by block 14, in response to such a request, the courier may confirm the scheduled delivery (e.g., delivery/pickup time), which may be done via communication with the banking system or via direct communication with the user (e.g., via the financial management application), and deliver a receptacle (e.g., an envelope) for receiving the cash deposit that includes a computer-readable image disposed on the receptacle. The computer-readable image may incorporate a validation key to confirm that the transaction was authorized when it is completed. In some embodiments, the computer-readable image (e.g., a bar code) may be generated upon confirmation of the cash amount at the time of deposit to facilitate inclusion of confirmatory information with respect to the deposit.

As represented by block 16, the cash deposit may be collected at a designated location and at a scheduled time. For example, the time may be based on a requested time and the location may be based on a requested location. It should be noted that the location may be designated to be within a threshold distance of the user's residence, location (e.g., as determined by global positioning system data) or the like. A courier vehicle may deliver the receptacle for the cash to the user that requested the transaction and the user may scan the associated computer-readable image to confirm that the deposit occurred. In some embodiments, system features may confirm the amount of cash (e.g., using an image sensor, an image capture system, a money counting device, confirmation by a courier employee). Such information may be used for confirmation and may be transmitted to the bank system (e.g., via the computer-readable image, which may be generated on-site). That is, in one embodiment, the image sensor of the user device or another suitable scanning device disposed on the receptacle may acquire an image or scan of the cash being placed in the receptacle. In this way, the receptacle may include circuitry or the like that may transmit the image data acquired by the scanning device to the banking system or the like.

In addition, by scanning the computer-readable image using an application properly linked to the banking system (e.g., the financial management application used to initiate the remote cash deposit), the transaction can be confirmed by the banking system, as represented by block 18. If the scan fails, the process 10 will request and allow the scan to be retried, as represented by block 20.

It should be noted that, in some embodiments, the scan may be performed by a scanning mechanism on the courier's vehicle, on the receptacle (e.g., a money counting, scanning and/or counterfeit detection machine), a hand-held scanner used by the courier service employee performing the COD service, or some other device. As a specific example, instead of the computer-readable image being provided by the courier to the user, the computer-readable image may be provided via physical mail to the user (e.g., as a sticker or printed on a receptacle), the computer-readable image may be provided electronically and printed on the receptacle (e.g., envelope) by the user (e.g., via a home computer and printer), or supplied and utilized electronically (e.g., via email or the financial management application and a device display) and scanned by the courier system to confirm receipt of the cash. In other embodiments, the courier service may deliver and scan the computer-readable image. In some embodiments, a user may take cash directly to a service provider's office (e.g., a courier's business location) and have their verification (e.g., computer-readable image) sent to them digitally (e.g., via email, text message, displayed on courier's device) or printed for them at the location.

The process 10 may also provide the user with the ability to designate one or more accounts for receiving all or varied amounts of the deposit if the scanned computer-readable image is confirmed, as represented by block 22. Whether a default account is used, an account is selected via the request, or an account is designated in block 22, the process 10 further includes processing the deposit into at least one account, as represented by block 24. If this step fails, the process 10 may be directed to retry the deposit, as indicated by block 20.

Figure 2:
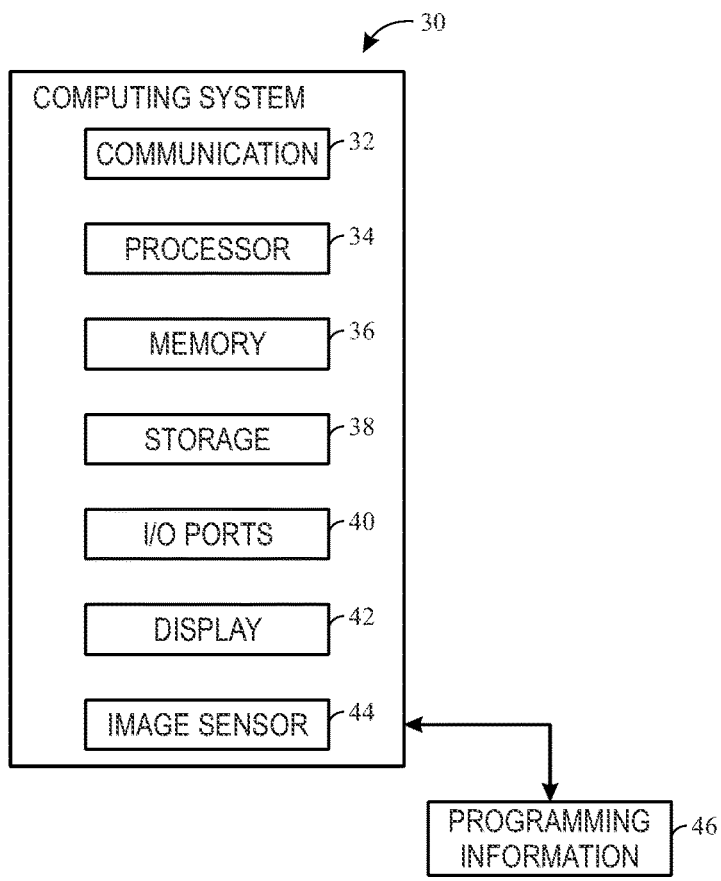
FIG. 2 illustrates a block diagram of a computing system that may employ the process of FIG. 1, in accordance with embodiments described herein.

To perform some of the actions set forth above, the process 10 may be performed by a computing system 30, which may include certain components to facilitate these actions. FIG. 2 is a block diagram of example components within the computing system 30. For example, the computing system 30 may include a communication component 32, a processor 34, a memory 36, a storage 38, input/output (I/O) ports 40, a display 42, an image sensor 44, and the like. The communication component 32 may be a wireless or wired communication component that may facilitate communication between the computing system 30, the computer network, a computing system of the courier, a computing system of the banking system, and the like.

The processor 34 may be any type of suitable computer processor or microprocessor capable of executing computer-executable code. The processor 34 may also include multiple processors that may perform the operations described herein. The memory 36 and the storage 38 may be any suitable articles of manufacture that can serve as media to store processor-executable code, data, or the like. These articles of manufacture may represent non-transitory, computer-readable media (e.g., any suitable form of memory or storage) that may store the processor-executable code used by the processor 34 to perform the presently disclosed techniques. The memory 36 and the storage 38 may also be used to store data, various other software applications, and the like. For example, the memory 36 and the storage 38 may not only store the processor-executable code used by the processor 34 to perform various techniques described herein but code for other techniques as well. It should be noted that non-transitory merely indicates that the media is tangible and not a signal.

The input/output (I/O) ports 40 may be interfaces that may couple to other peripheral components such as input devices (e.g., keyboard, mouse), sensors, input/output (I/O) modules, and the like. The display 42 may operate to depict visualizations associated with software or executable code being processed by the processor 34. In one embodiment, the display 42 may be a touch display capable of receiving inputs from a user of the computing system 30. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the computing system 30.

In certain embodiments, the computing system 30 may include an image sensor 44. The image sensor 44 may be an optical device or camera that may acquire still images or video data via a lens or other image acquiring material disposed on the computing system 30. In addition, the image sensor 44 may perform various scanning operations described herein.

The computing system 30 may have access to certain programming information 46 that may include computer-executable instructions to cause the processor 34 or the like to perform certain operations as described herein. The programming information 46 may specify how the computing system 30 operates, interacts with other computing devices, interacts with various databases, and the like.

It should be noted that the components described above with regard to the computing system 30 are exemplary components and the computing system 30 may include additional or fewer components as shown. Additionally, it should be noted that the computing device associated with other organizations (e.g., courier, banking system) may also include similar components as described as part of the computing system 30.

Figure 3:
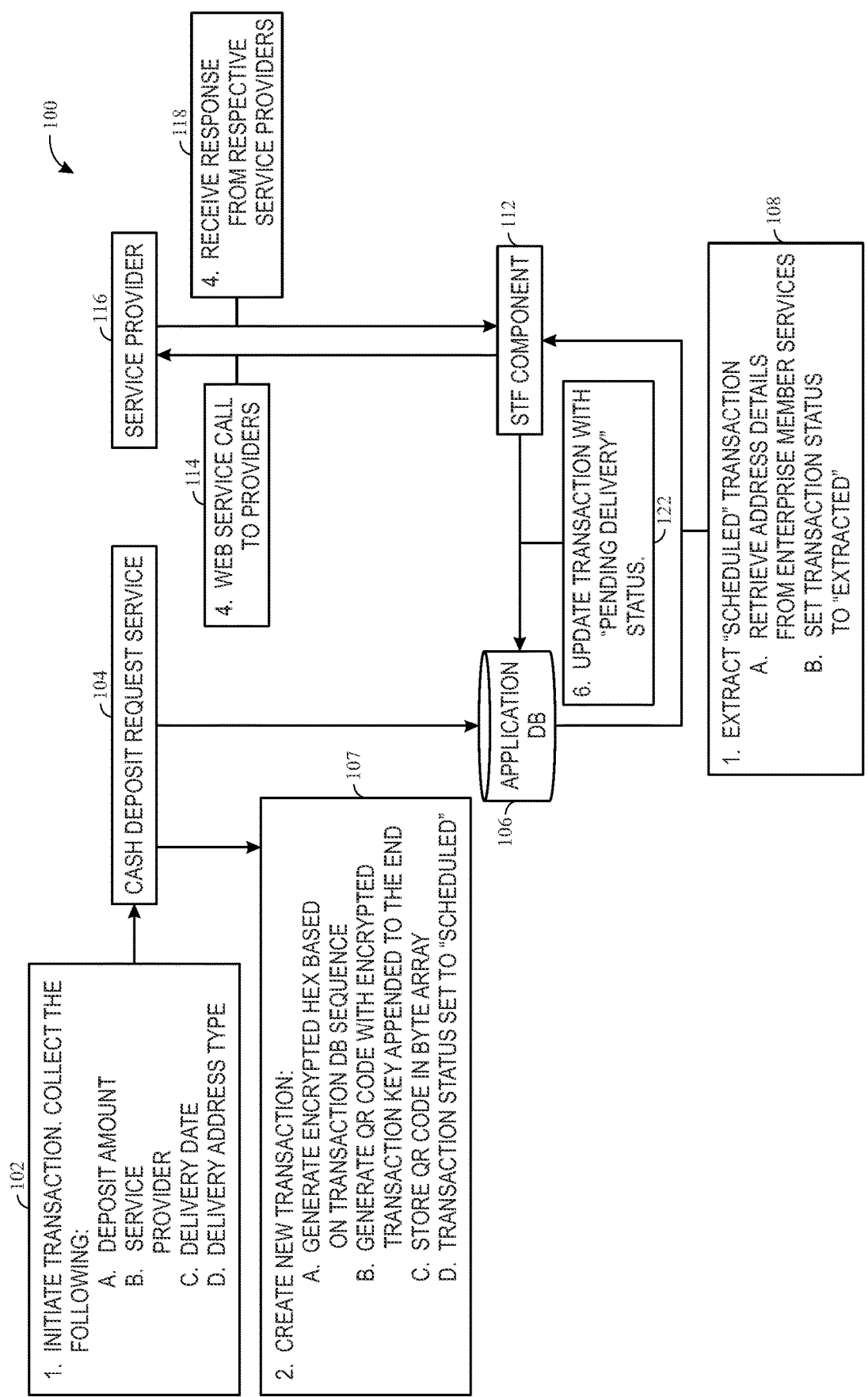
FIG. 3 illustrates a data flow diagram of a system for scheduling a remote cash deposit, in accordance with embodiments described herein.

FIG. 3 illustrates a block diagram of a system 100 for scheduling a remote cash deposit, in accordance with embodiments described herein. As illustrated by block 102, the transaction is initiated by a user employing a financial management application (e.g., a software application stored in a memory or non-transitory computer-readable medium and including code activated by a processor) on a user device (e.g., a smart phone, the computing system 30) to submit a request. Initiating the transaction may include inputting a cash amount for deposit, a service provider selection (e.g., selection of one of multiple available courier services, which may be based on performance data provided via the financial management application), a delivery date, and a delivery location. In the illustrated embodiment, the request is processed by Cash Deposit Request Service 104, which is representative of a request service server or application that may be communicatively coupled to the user device accessible to a mobile application (e.g., the financial management application) of the user device. The Cash Deposit Request Service 104 may coordinate with an application database 106, which may be part of a bank-side computer system, to create a new transaction. As illustrated by block 107, this may include generating an encrypted hex (a string of characters in hexadecimal format that can be encrypted to establish an encrypted hex of the database sequence, which serves as an encrypted transaction key) based on a transaction database sequence (a unique identifier that is systematically generated for each row in the table such that each cash deposit request will have a unique identifier), generating a computer-readable image (e.g., a QR code or bar code) from a string of characters that incorporates the encrypted transaction key (e.g., appended to the end), stores the computer-readable image in a byte array (the format in which QR code is stored in the database and transmitted to service providers), and setting a transaction status to "Scheduled." After the new transaction is generated, the Cash Deposit Request Service 104 may store the newly generated transaction in the application database 106. As an example a QR code may be generated based on the following lineup of data: depositAmount:deliveryDate:encryptedTransactionKey. Although the encryption format is described above as hexadecimal, it should be noted that any suitable encryption process may be used in the embodiments described herein.

As illustrated by block 108, the "Scheduled" transaction is then extracted from the application database 106 and the status of the transaction is changed to "Extracted." Extracting the "Scheduled" transaction may include retrieving location details (e.g., determining a home address from a user database, retrieving an indicated location from the user's request, determining a location based on global positioning system information) for the delivery, retrieving a timeframe (e.g., a date) for the delivery, retrieving an amount for the deposit, a requested service provider, and so forth. Some or all of the extracted information (e.g., time, location, courier service) may be provided to a Schedule Task Framework (STF) component 112. The STF component 112 may then request (e.g., via a web service call) services from the selected courier service, request a bid from multiple service providers, or request services from a fixed service provider. This request is represented by block 114. The service provider(s) are represented by block 116 and a response from the service providers 116 is provided to the STF component 112, as represented by block 118. Upon confirmation that a specific service provider 116 will facilitate the transaction (and, in some embodiments, confirmation or designation of associated fees), the STF component 112 updates the status of the transaction to "Pending Delivery," as represented by block 122.

It should be noted that the components and systems described herein may employ components described as being part of the computing system 30. That is, each component or system may be a separate computing system that includes at least some of the components described above in FIG. 2 to enable the respective device to perform the operations described herein. Indeed, each respective device may include specific computer-executable code based on the respective operation being performed within the processes described herein.

Figure 4:
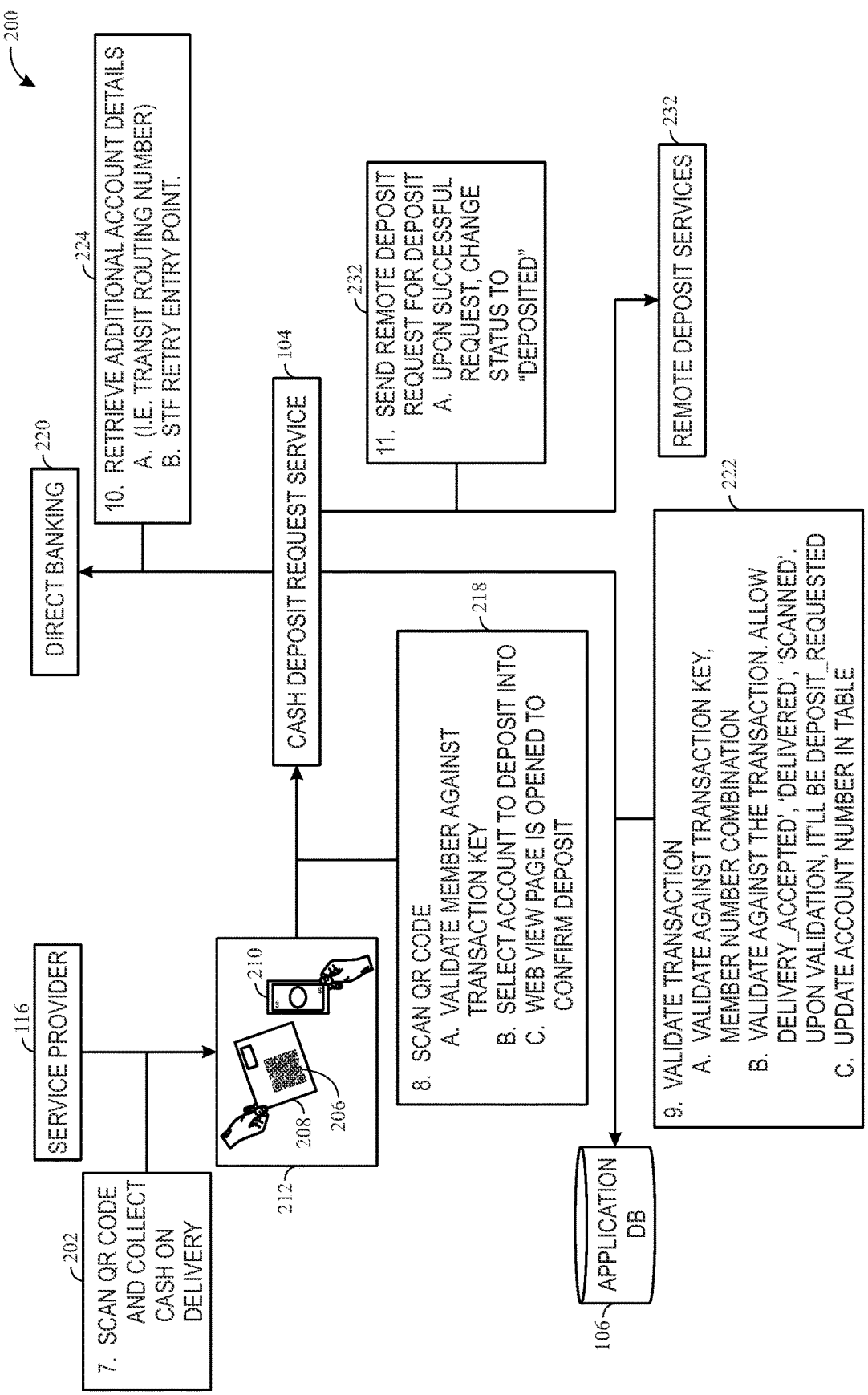
FIG. 4 illustrates a data flow diagram of a system for performing and confirming a remote cash deposit, in accordance with embodiments described herein.

FIG. 4 illustrates a block diagram of a system 200 for performing and confirming a remote cash deposit, in accordance with embodiments described herein. The system 200 may be a continuation of system 100 illustrated in FIG. 2. Indeed, after a remote cash deposit transaction has been scheduled and approved, the system 200 may begin with generation of the computer-readable image (e.g., QR code), as represented by block 202. As discussed above, this may be performed by the service provider 116 in the process of performing the COD/remote cash deposit transaction, as illustrated by block 202 in FIG. 3. However, this may also be performed separately (e.g., via a separate mailing of the QR code to the user, electronic transmission of the QR code to the user, or printing of the QR code). In the illustrated embodiment, a computer-readable image 206 may be disposed on a receptacle (e.g., envelope) 208 for receiving cash 210 as a component of the remote deposit transaction, as represented by block 212. To facilitate tracking and confirmation of the transfer of cash, the computer-readable image 206 may be scanned to validate the member against the transaction key. For example, the user may employ the same user device and/or financial management application used to request the transaction to scan the computer-readable code associated with the receptacle 208 when the receptacle 208 is delivered to the user, as represented by block 218. In one embodiment, block 218 represents validation of a deposit transaction when an end user scans the QR code with a mobile device (e.g., the computing system 30, smart phone), which will decrypt the code and send the decrypted transaction key to Cash Deposit Request Service 104, which will validate the transaction key and the unique member identifier against a record in the application database (as represented by steps A and B in block 222) to allow the process to proceed. This may also include selecting one or more of several available accounts for receiving an electronic deposit based on the transfer of cash. Further, a webpage may be opened to demonstrate confirmation of the deposit or some other form of confirmation may be provided (e.g., via the financial management application on the user device). The web page may be generated by the Cash Deposit Request Service 104, which may coordinate with the financial management application on the user device.

The Cash Deposit Request Service 104 may further operate to confirm or validate the transaction by coordinating with the application database 106 and retrieve additional account details from direct banking 220, which may be described as a system responsible for retrieval and update of bank account details for users. Specifically, as represented by blocks 222 and 224, this may include validation against certain identifiers (e.g., the transaction key, a member number or a combination of such identifiers), validation against a transaction status, updating of an account, management of routing data (e.g., a transit routing number, a STF retry entry point), and so forth. The status of the transaction may be updated to "Delivery Accepted," "Delivered," "Scanned," and so forth to represent the current state of the transaction. In other embodiments, other methods or values may be employed to track the status of the transaction. Transaction status may be used to keep track of progression of a particular cash deposit request, add a layer of security against unfavorable action (e.g., scanning a QR code more than once), and validate current status with actions performed. Further, as represented by block 232, the Cash Deposit Request Service 104 may coordinate with Remote Deposit Services 232 to submit a remote deposit request and change the status of the transaction to "Deposited" as confirmation of a successful deposit request. The Remote Deposit Services 232 may include a server component or application that may coordinate with the Cash Deposit Request Service 104 to update the status for each respective transaction in the application database 106. In some embodiments, the Remote Deposit Services 232 may be associated or linked to the courier service to confirm receipt of the cash 210 and transfer funds from the courier service to the respective bank or account selected by the user.

As the status changes for various parts of the system 200 described above, the respective computing device that determines the status change may send a notification to other computing devices related to the respective transaction. The notification, in some embodiments, may cause the recipient computing device to open or execute a corresponding application to provide an indication of the status change to the respective user.

Figure 5:
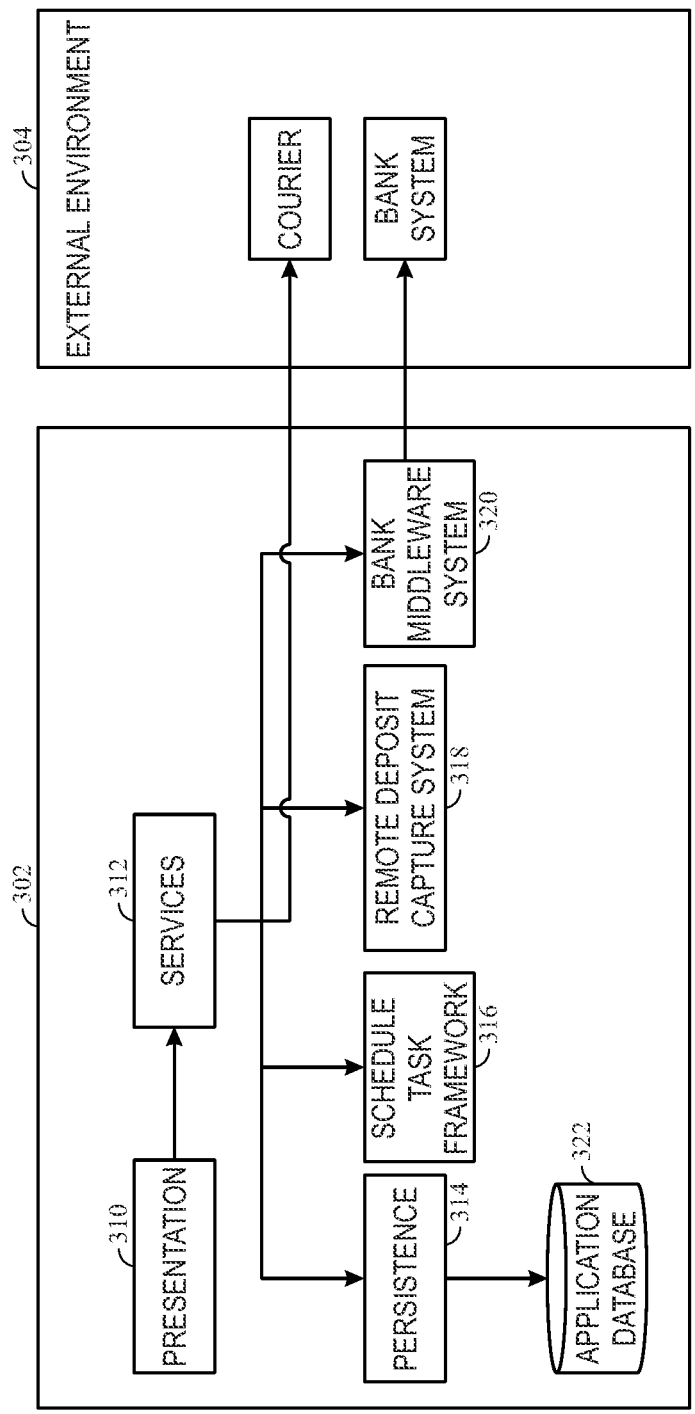
FIG. 5 illustrates a block diagram of a system for performing remote cash deposits, in accordance with embodiments described herein.

FIG. 5 illustrates a block diagram of a system for performing remote cash deposits, in accordance with embodiments described herein. The system includes a bank-side system 302 (e.g., computer network) and external environments 304 (e.g., external computer networks at participating entities, such as courier service providers and other account holders). In the illustrated embodiment, the bank-side system 302 includes presentation 310, services 312, persistence 314, scheduled task framework 316, remote deposit capture system 318, bank middleware system 320, and an application database 322. The banks-side system 302 communicates with the external environment 304 via the services 312 and the direct banking 320.

With respect to systems and methods on a courier's side of transactions in accordance with present embodiments, after the courier has received the cash as a component of a cash deposit, the courier may use systems and methods for confirming daily wire transfers in proportion to the received cash. In one embodiment a courier cash deposit application (e.g., executed on a respective computing system 30) may perform certain actions when receiving cash deposits, such as verify an identity of a user providing cash via biometrics, facial detection, multi-component identification, and so forth. Further, a courier vehicle may include secure devices for storage of cash.

Further still, a courier-side application may evaluate a current delivery schedule for each courier currently in route to a transaction, identify couriers or courier vehicles that are scheduled to deliver in an area that corresponds to a cash deposit request (and that have proper equipment for cash deposits), add cash deposit pick-up to a current schedule, and so forth. In some embodiments, the respective computing system 30 that identifies a courier vehicle in a particular area may send a notification to another computing system 30 associated with the courier driving the courier vehicle. The notification may cause the courier cash deposit application to adjust a schedule of the respective courier to include the cash deposit pick-up. As such, the courier cash deposit application may interact with the current schedule of the courier and determine when the courier is scheduled to be located closest to the location of the cash deposit pick-up. The courier cash deposit application may then incorporate the cash deposit pick-up location into the courier's current schedule, such that the cash deposit pick-up is scheduled when the courier is scheduled to be closest to the location of the cash deposit pick-up. The courier cash deposit application may then adjust the delivery times of the remaining items in the courier's schedule. After the schedule has been updated, the courier cash deposit application may display a notification indicative of the schedule change. In addition, the courier cash deposit application may send notifications or updates to other computing systems 30 to indicate the schedule change and to confirm that the cash delivery pick-up has indeed been scheduled. As mentioned above, in some embodiments, upon receiving the notification, the computing system 30 may execute or open a corresponding application regardless of whether the application is in a sleep mode or not to provide an indication of the scheduled cash delivery pick-up.

In addition to receiving cash, the presently disclosed systems and techniques may also be used to receive an official check from a financial institution via the courier service or the like. For example, using the same process described above to request a cash deposit, a user may employ the computing system 30 to request an official check. In this case, the courier may meet the user, collect cash from the member using the embodiments described herein, and then provide the user with a printed official check along with a code (e.g., QR code) that is indicative of the check issuance and the cash receipt. The user may then scan the code via the computing system 30 as described above to complete the transaction and enable their use of their official check.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An apparatus, comprising:
one or more image sensors;
an electronic display; and
one or more processors configured to:
receive one or more images of cash received by the apparatus, wherein the one or more images are acquired via the one or more image sensors;
generate a machine-readable image representative of an amount of the cash received by the apparatus; and
display the machine-readable image via the electronic display, wherein the machine-readable image comprises a transaction key, and wherein a server device is configured to:
receive the transaction key;
validate an identity of a user and an account associated with the user based on the transaction key; and
transfer funds corresponding to the amount of the cash into the account associated with the user in response to validating the identity of the user.

2. The apparatus of claim 1, wherein the one or more processors are configured to generate the machine-readable image based on one or more serial numbers associated with the cash.

3. The apparatus of claim 2, wherein the one or more image sensors are configured to employ optical character recognition (OCR) to acquire the one or more serial numbers.

4. The apparatus of claim 2, wherein the machine-readable image is representative of the one or more serial numbers associated with the cash.

5. The apparatus of claim 1, wherein the machine-readable image is configured to be scanned by an additional image sensor of a mobile device.

6. The apparatus of claim 1, wherein the machine-readable image is configured to cause a mobile device to generate a visualization comprising a list of accounts for depositing the cash.

7. The apparatus of claim 1, wherein the one or more processors are configured to send a notification to a banking system to update an account to reflect a deposit of the cash.

8. The apparatus of claim 1, wherein the one or more processors are configured to wire an amount of funds to a banking system based on the cash.

9. A method, comprising:
receiving, via a processor, one or more images of cash received by a receptacle configured to receive the cash, wherein the one or more images are acquired via one or more image sensors disposed on the receptacle;
generating, via the processor, a machine-readable image representative of an amount of the cash received by the receptacle; and
displaying, via the processor, the machine-readable image via an electronic display disposed on the receptacle, wherein the machine-readable image comprises a transaction key, and wherein a server device is configured to:
receive the transaction key;
validate an identity of a user and an account associated with the user based on the transaction key; and
transfer funds corresponding to the amount of the cash into the account associated with the user in response to validating the identity of the user.

10. The method of claim 9, wherein the machine-readable image is generated based on one or more serial numbers associated with the cash.

11. The method of claim 9, wherein the machine-readable image comprises a Quick Response (QR) code.

12. The method of claim 9, comprising employing optical character recognition (OCR) to acquire one or more serial numbers associated with the cash.

13. The method of claim 9, wherein the machine-readable image is configured to be scanned by an additional image sensor of a mobile device.

14. The method of claim 9, wherein the machine-readable image comprises a validation key configured to confirm an authorization of a deposit of the cash into a bank account.

15. A system, comprising:
a receptacle, comprising:
an image sensor configured to receive an image of cash placed in the receptacle;
at least one processor configured to generate a machine-readable image based on the image of cash; and
an electronic display configured to present the machine-readable image representative of an amount of the cash received by the receptacle; and a computing device, comprising a processor configured to:
 receive a request for a deposit of the cash into an account;
 receive the machine-readable image via one or more image sensors;
 determine a transaction key based on the machine-readable image; and
 send the transaction key to a server device, wherein the server device is configured to:
  validate an identity of a user and an account associated with the user based on the transaction key; and
  transfer funds associated with the deposit into the account associated with the user in response to validating the identity of the user.

16. The system of claim 15, wherein the machine-readable image comprises a bar code or a Quick Response code.

17. The system of claim 15, wherein the user request comprises a time, date, a location, a courier service provider, or any combination thereof.

18. The system of claim 15, wherein the receptacle comprises a container configured to store the cash.

19. The system of claim 15, wherein the image sensor is configured to capture one or more images of the cash as the cash is disposed in the receptacle.

20. The system of claim 19, wherein the machine-readable image is configured to encode one or more serial numbers of the cash into the machine-readable image.

\* \* \* \* \*